Patented Aug. 16, 1927.

1,638,832

UNITED STATES PATENT OFFICE.

MOSES L. CROSSLEY, OF BOUNDBROOK, AND MAURICE L. DOLT, OF SOMERVILLE, NEW JERSEY, ASSIGNORS TO THE CALCO CHEMICAL COMPANY, OF BOUNDBROOK, NEW JERSEY, A CORPORATION OF NEW JERSEY.

LITHIUM SALT OF 2-PHENYLQUINOLINE-4-CARBOXYLIC ACID AND PROCESS OF MAKING THE SAME.

No Drawing.     Application filed June 9, 1925. Serial No. 36,010.

This invention relates to the manufacture of the lithium salt of 2-phenylquinoline-4-carboxylic acid, which salt, in the anhydrous form, has the structural formula:

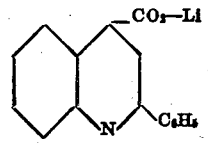

and in the hydrated form the formula:

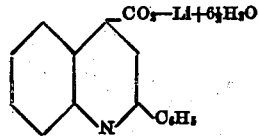

The new product may be obtained by treating 2-phenylquinoline-4-carboxylic acid with lithium carbonate in aqueous solution in the following manner.

100 parts of pure 2-phenylquinoline-4-carboxylic acid are suspended in 1000 parts of water at about 60° C. and 14 parts of pure solid lithium carbonate are added. The neutral solution is then filtered and the filtrate concentrated to a little less than one half its original volume at a temperature between 70 and 100° C. and kept at this temperature until the anhydrous salt begins to separate out in fine white silky needles. The salt is filtered off by suction and washed rapidly with ice water. This product dried in the air or in an oven at atmospheric pressure, or under vacuum, corresponds by analysis to the anhydrous lithium salt. It is soluble in 95% ethyl alcohol, 100 parts of alcohol dissolving 15.3 parts of the anhydrous salt.

As an alternative process, 100 parts of pure 2-phenylquinoline-4-carboxylic acid are suspended in 1000 parts of water at about 60° C. and 14 parts of pure solid lithium carbonate are added. The hot solution is filtered and the filtrate concentrated down to one half its original volume at a temperature of 70 to 100° C. The solution, which is slightly cloudy, is filtered through a hot water funnel and the filtrate collected in a vessel surrounded with ice water and cooled, filtration and cooling being performed as rapidly as possible to prevent the formation of the anhydrous salt. On long standing beautiful transparent triclinic crystals of the hydrated lithium salt separate out. These are filtered off, washed once with ice water and air dried at room temperature for about 4 hours or as long as they retain their transparency. Under these conditions the lithium salt of 2-phenylquinoline-4-carboxylic acid with 6½ moles of water of crystallization is obtained. On longer standing in the air the crystals lose their transparency and continue losing water until the hydrate with 1 mole of water is obtained. This last mole of water is removed only at a temperature of 130°–140° C. or in vacuum over sulphuric acid. The lithium salt with 6½ $H_2O$ is readily soluble in water, 100 parts of water dissolving 17.3 parts of the salt. It is adapted for use, more particularly, as a therapeutic and medicinal agent.

It will be understood to those skilled in the art, that in obtaining the general result desired, the specific processes described may be modified within reasonable limits without departing from the spirit or substance of the invention the scope of which is commensurate with the appended claims.

Having thus fully described the invention, what we claim as new and desire to secure by Letters Patent is:

1. As a new product, the lithium salt of 2-phenylquinoline-4-carboxylic acid.

2. As a new product, a hydrated lithium salt of 2-phenylquinoline-4-carboxylic acid, the same being of a whitish crystalline form and being soluble in water and ethyl alcohol.

3. The process of making the lithium salt of 2-phenylquinoline-4-carboxylic acid, which consists in treating an aqueous solution of 2-phenylquinoline-4-carboxylic acid with lithium carbonate, filtering the resulting solution, and concentrating the filtrate until the said lithium organic salt separates.

4. The process of making the lithium salt of 2-phenylquinoline-4-carboxylic acid, which consists in treating an aqueous solution of 2-phenylquinoline-4-carboxylic acid with lithium carbonate, filtering the resulting solution, concentrating the filtrate until the said lithium organic salt separates, and thereafter separating the precipitate, washing and drying it.

5. The process of making the lithium salt of 2-phenylquinoline-4-carboxylic acid, which consists in suspending substantially 100 parts of 2-phenylquinoline-4-carboxylic acid in about 1000 parts water at approximately 60° C. and adding thereto about 14 parts of solid lithium carbonate, filtering the solution, concentrating the filtrate at a temperature of from 70 to 100° C., and again filtering and cooling the filtrate and thereafter allowing it to stand, whereby the lithium organic salt separate and may then be treated as desired.

In testimony whereof we have signed the foregoing specification.

MOSES L. CROSSLEY.
MAURICE L. DOLT.